United States Patent [19]
Lee et al.

[11] Patent Number: 5,150,275
[45] Date of Patent: Sep. 22, 1992

[54] CAPACITIVE PRESSURE SENSOR

[75] Inventors: Shih-Ying Lee, Lincoln; Sen Z. Li, Acton, both of Mass.

[73] Assignee: Setra Systems, Inc., Acton, Mass.

[21] Appl. No.: 723,372

[22] Filed: Jul. 1, 1991

[51] Int. Cl.⁵ .............................................. H01G 7/00
[52] U.S. Cl. ...................................... 361/283; 73/724
[58] Field of Search ................... 361/283; 73/718, 724

[56] References Cited

U.S. PATENT DOCUMENTS

| | | | |
|---|---|---|---|
| 4,084,438 | 4/1978 | Lee et al. | 73/706 |
| 4,168,518 | 9/1979 | Lee | 361/283 |
| 4,358,814 | 10/1980 | Lee et al. | 361/283 |

*Primary Examiner*—Donald A. Griffin
*Attorney, Agent, or Firm*—Lahive & Cockfield

[57] ABSTRACT

A capacitance pressure sensor includes a conductive diaphragm positioned between two pneumatically separate regions. The diaphragm is supported at its periphery by a concave base member. An electrode assembly establishes a substantially planar conductive surface opposite to, and spaced apart by a nominal gap from, the conductive diaphragm. The electrode assembly includes the conductive surface and a plurality of support legs extending through, and secured at, apertures in the base member.

15 Claims, 4 Drawing Sheets

CAPACITIVE PRESSURE SENSOR

BACKGROUND OF THE INVENTION

This invention relates to a pressure sensor and more particularly, a pressure sensor which relies on changes in capacitance to indicate pressure fluctuations.

Capacitive pressure sensors are well known in the prior art. Such sensors typically include a fixed element having a rigid, planar conductive surface forming one plate of a substantially parallel plate capacitor. A deformable conductive member, such as a metal foil diaphragm, forms the other plate of the capacitor. Generally, the diaphragm is edge-supported so that a central portion is substantially parallel to and opposite the fixed plate. Since the sensor generally has the form of a parallel plate capacitor, the characteristic capacitance of the sensor is inversely proportional to the gap, d, between central portion of the diaphragm and the conductive surface of the fixed element. In order for there to permit a pressure differential across the diaphragm, the region on one side of the diaphragm is sealed from the region on the opposite side.

In practice, the diaphragm elasticity is selected so that pressure differentials across the diaphragm in a particular range of interest cause displacements of the central portion of the diaphragm. These pressure differential-induced displacements result in corresponding variations in the gap, d, between the two capacitor places, and thus in capacitance variations in the sensor capacitor. For relatively high sensitivity, such sensors require high changes of capacitance in response to relatively small gap changes. To achieve such sensitivity from unit to unit, nominal gap dimensions generally require that their component parts be manufactured to very close tolerances to establish the required dimensional relationships. In addition, the structure and materials must maintain those relationships over a useful temperature range.

In one form the prior art sensor, exemplified by the sensor of the Model 237 transducer manufactured by Setra Systems, Inc, assignee of the subject invention, a fixed metallic electrode is supported with respect to the diaphragm support member by means of an electrically non-conductive glass portion. Because of the differences in the thermal expansion coefficients between such glass and the metal electrode and diaphragm support member, temperature changes cause changes in the gap between the fixed electrode and diaphragm (i.e. the plates of the capacitor), resulting in erroneous pressure readings. In addition, the effective seal between the regions on opposite sides of the diaphragm may only be economically maintained over a relatively small temperature range. Thus, such sensors give reliable pressure readings over only a relatively small range of temperatures.

Moreover, during the manufacture of such sensors, the fixed electrode must be set in the glass portion and then the conductive plate portion must generally be tailored (e.g. by lapping) to establish the necessary gap and parallelism. Consequently, those variable capacitance pressure sensors are relatively expensive to manufacture.

Moreover, during the manufacture of such sensors, the fixed electrode is generally set into the glass portion while the glass is in its molten state. As the assembly cools, mechanical stresses are set up which typically alter the desired initial gap dimension or degrade the parallelism between the capacitive plates. Following cooling of the assembly, the fixed electrode may need to be tailored (e.g. by lapping) to re-establish the critical gap and parallelism. In view of these processing steps, such sensors are relatively difficult and correspondingly expensive to manufacture.

Another type of prior art sensor is disclosed in U.S. Pat. No. 4,358,814, assigned to the assignee of the subject invention. That prior art sensor, exemplified by the Models 264 and C264 transducer and transmitter, manufactured by Setra Systems, Inc., includes a cup-like, or concave, metal base member coupled to a base support at the center of the bottom of the base member. The base member includes a peripheral flange portion extending from its rim, where the flange is generally planar except for a circumferential depression. A relatively thin, deformable conductive diaphragm is disposed across the peripheral flange of the base member. A clamping ring having a surface which complements the flange of the base member is affixed to the edge of the diaphragm and the flange so that the diaphragm is clamped under tension to the flange.

An electrode assembly is affixed to the base support within the closed volume formed by the base member and diaphragm assembly. The electrode assembly includes a conductive electrode having a planar portion and a dielectric support member. The support member is connected to the base support so that the planar portion of the electrode is substantially parallel to and displaced by a predetermined distance d, from the flange of the base member. With this configuration, the diaphragm and the planar portion of the electrode form a parallel plate capacitor. Moreover, in response to pressure differentials, the diaphragm is displaced, resulting in corresponding changes in capacitance. Electrical connection to the capacitor may be provided by direct connection to the base member for one plate and a feed-through connection to the plate formed by the planar portion of the electrode.

The latter type of prior art sensor is quite effective in the measurement of pressure. Moreover, there are few high tolerance parts and complex assembly operations, with the only critical dimensional assembly operation being the initial alignment of the electrode with respect to the flange of the base member. Since this step only involves solid materials at room temperature, there are minimal mechanical stresses established. Moreover, since there are no glass-to-metal seals, there are no problems due to mis-match of temperature coefficients. Consequently, that prior art sensor provides a high sensitivity broad temperature range capacitance pressure sensor.

However, the latter type of prior art sensor has not been practical in certain segments of the market due to its relative complexity and relative high cost of manufacturing. Part of the high manufacturing cost is because of the necessity of controlling the thickness of the metallized electrode of that sensor and the dimensional tolerance of the main housing. The metallized electrode, which is generally made of ceramic disc, also represents significant cost. In addition, there is a need of an outside casing to house the sensor and the measurement circuit.

It is an aspect of the present invention to provide an improved pressure sensor.

Another object is to provide a high performance pressure sensor that is relatively inexpensive and easy to manufacture.

SUMMARY OF THE INVENTION

The present invention is an improved capacitance pressure sensor, adapted for high accuracy measurement of pressure using a low cost, easily assembled structure. The sensor includes a conductive diaphragm positioned between two pneumatically separate regions. The diaphragm is supported at its periphery by a concave base member, defining one of the regions to be interior to the base member and bounded in part by a first side of the diaphragm. An electrode assembly is rigidly coupled to the base member and establishes a substantially planar conductive surface opposite to, and spaced apart by a nominal gap from, the conductive diaphragm. The conductive surface is preferably planar, but may slightly differ, for example, being slightly concave to match anticipated maximum deflections of the diaphragm in use.

The electrode assembly includes a set of n apertures extending through the first base member, where n is an integer greater than or equal to 2. In the preferred form of the invention, n=3. That assembly further includes a first rigid, electrically conductive electrode including the above-mentioned conductive surface and includes n elongated leg portions extending away from the conductive surface and angularly offset therefrom, and extending through associated ones of the n apertures in the base member. The leg portions in the respective ones of the associated apertures are secured whereby the electrode is electrically insulated from the diaphragm, and the first region is pneumatically separate from a second region adjacent to the second side of the diaphragm. Preferably, the leg portions are secured using a dielectric bonding material that cooperates to establish a shear joint formed between the leg portions and the base member. A concave upper housing may be attached to the periphery of the diaphragm facing the second side of that element, thereby enclosing the second region.

With this configuration, a capacitance detector circuit may be coupled between diaphragm and the planar conductive surface of the electrode, to permit measurement of the variation in capacitance as the diaphragm is displaced relative to the electrode due to variations in the pressure differential across the diaphragm.

In alternative embodiments, the upper housing may be replaced by elements similar to the base member and electrode assembly but facing the second side at the diaphragm, and including a second capacitance detection circuit. The latter configuration provides a push-pull sensing arrangement useful in otherwise conventional pressure sensors.

BRIEF DESCRIPTION OF THE DRAWINGS

The foregoing and other objects of this invention, the various feature thereof, as well as the invention itself, may be more fully understood from the following description, when read together with the accompanying drawings in which.

DESCRIPTION OF THE PREFERRED EMBODIMENT

Figure 1:
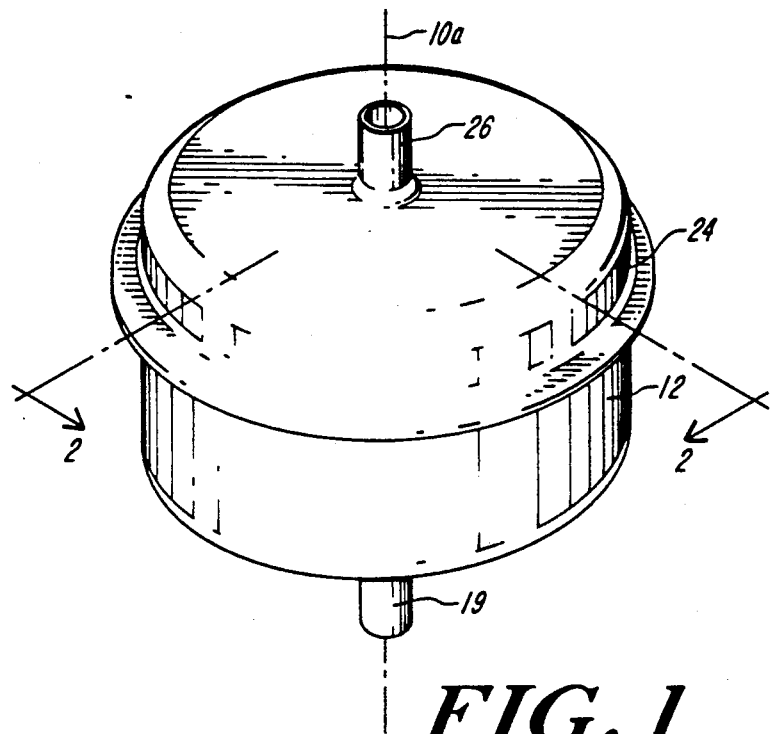
FIG. 1 shows in perspective a sensor in accordance with the present invention.
Figure 2:
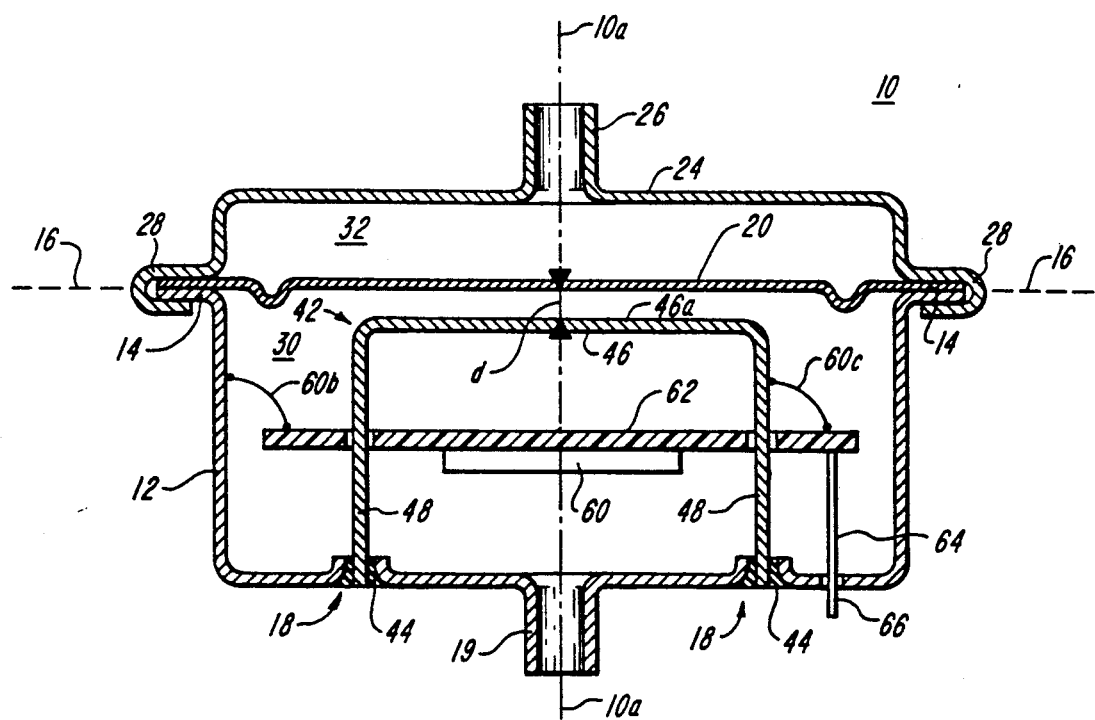
FIG. 2 shows a sectional view of the sensor of FIG. 1.

FIGS. 1 and 2 show a capacitive sensor 10 which includes a concave or cup-shaped base member 12 having a circular peripheral rim 14 lying in a plane (indicated by broken line 16 in FIG. 1) and extending symmetrically about a reference axis 10a. The base member includes three apertures 18 (two apertures 18 are shown in FIG. 1) equiangularly dispersed about axis 10a and a pressure port 19 is positioned along axis 10a. In the preferred embodiment, the base member is made of stamped sheet metal, preferably stainless steel, although other metals or alloys and constructions techniques may be used.

A relatively thin, deformable conductive diaphragm 20 stretches across the base member 12 so that its peripheral edge overlie the rim 14. In one form, the diaphragm 20 may be made of stainless steel, having a thickness in the range of 0.0002 to 0.030 inches. Alternatively, the diaphragm 20 have the form disclosed in U.S. Pat. No. 4,434,203. The diaphragm may be a metal foil, or a non-conductive material having a conductive portion, for example, established by a deposited conductive film.

A concave or cup-shaped housing 24 is positioned over the diaphragm 20. Housing 24 includes a pressure port 26 and a peripheral flange 28 that is folded, or crimped, to the peripheral rim 14 of the base member in a manner capturing the peripheral edge of the diaphragm 20 with diaphragm 20 forming a planar and sheet, and providing an air tight seal at that edge. As a result two distinct regions of interest 30 and 32 are established; the first region 30 is below diaphragm 20 as shown in FIG. 2 and the second region 32 is above diaphragm 20 as shown in FIG. 2. The two regions may be separately pressurized by couplings attached to pressure ports 19 and 26 to establish a pressure differential across diaphragm 20. The central portion of diaphragm 20 is movable in the direction of axis 10 in response to that pressure differential.

Figure 3A:
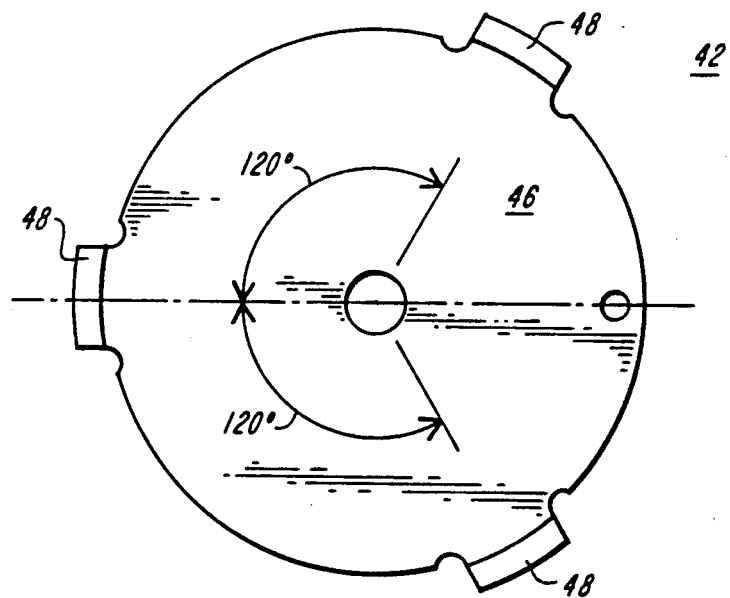
FIG. 3A shows a top plan view of the fixed electrode of sensor of FIG. 1.
Figure 3B:
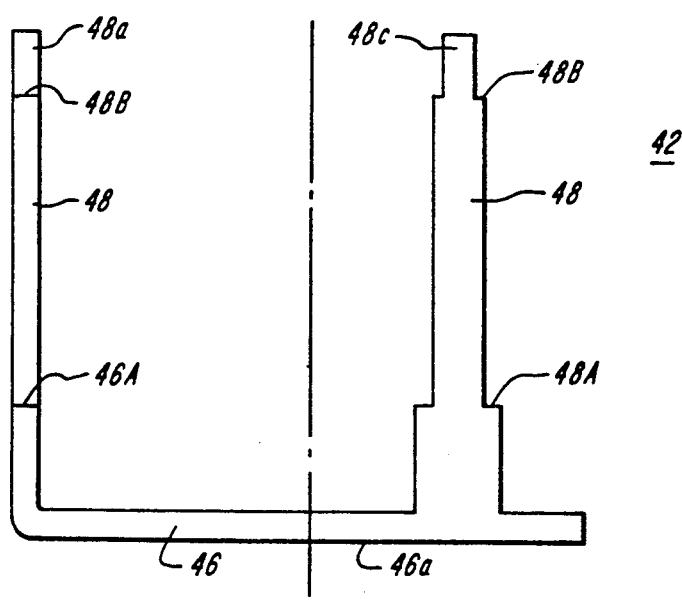
FIG. 3B shows a side plan view of the fixed electrode of the sensor of FIG. 1.

An electrode assembly is positioned within region 30. In the embodiment illustrated in FIG. 2, the electrode assembly includes an electrode element 42 and fixture elements 44 for holding electrode element 42 in place within region 30. Element 42 is preferably a metal-stamped element shown in FIGS. 3A and 3B, having a substantially planar disk-shaped central portion 46 with three downwardly (as shown in FIG. 2) extending leg portions 48. In the preferred form, each of legs 48 is progressively narrowed at shoulder regions 48A and 48B. In alternate configurations different numbers and shapes of legs may be used with electrode element 42. However, in all cases, the region 46 establishes an electrically conductive element opposite and nominally separated by a distance d from the central region of diaphragm 20. Preferably, the region 46 has a substantially planar top (as shown in FIG. 2) surface, but in some forms of the invention that surface may be curved to match the anticipated curve of the diaphragm 20 when deflected or deformed (for example, by a pressure differential), and still be within the meaning of the term "substantially planar" as used herein.

The electrode 42 is positioned with the distal tips 48a of legs 48 extending through the associated holes 18 in the base member 12. The fixture elements 44 rigidly hold those distal tips 48a in place so that the top surface 46a of portion 46 is substantially parallel to and nominally a predetermined distanced from plane 16. In the preferred form of the invention, fixture elements 44 are formed from a matched (to base member 12) temperature coefficient, dielectric bonding material (thereby electrically insulating electrode 42 from diaphragm 20) such as epoxy, glass or other plastic material which is cured in place thermally or through catalytic reaction, and is transformed from a fluid state to a solid state. When the electrode 42 and the base member 12 are thus fixtured while the cementing material cures in place, the fixture elements 44 provide the dual functions of positioning the electrode 42 precisely relative to the rim of the base member, as well as provide the required insulation. By way of example, the fixture elements 44 may be made of stycast epoxy, manufactured by Emerson Cummings division of Grace Chemical Corporation.

Since the capacitance across the dielectric fixture elements 44 represent a parallel, inactive capacitance between the diaphragm 20 and the electrode 42, its effect is to dilute the active capacitance variation between the diaphragm 20 and the electrode 42 caused by pressure. For optimal performance, it is important that this leakage capacitance be reduced to a minimum. This objective is accomplished by the reduced cross sectional area at the distal tips 48a of the legs 48.

Under variable temperature conditions, the insulation material forming fixture elements 44 cause minimum relative motion between the electrode and main housing. It is well known that the thermal coefficient of expansion for metallic material is often different substantially from that of a dielectric material. The shear joint configuration as described above minimizes the position shift of the electrode 42 relative to the base member 12. Under varying temperature conditions, the stress in the joint may change, but there will be substantially no net relative movement between the electrode 42 and the base member 12.

The dielectric constant of the insulation material of fixture elements 44 is preferably relatively insensitive to temperature and humidity. In one form of the invention, the insulation material incorporates particles of powder of certain stable dielectric materials, such as alumina powder. This powder filler controls the thermal properties of the joining material. It also reduces the moisture absorption of the bonding material.

The fixture elements 44 form a strong and stable bond between legs 48 and base member 12, by virtue of the shear joint established between distal tips 48a and the tubular inner contour of holes 19. As a result, the electrode 42 and base member 14 form a very stable and rigid structure which resists effects of shock and vibration in all directions.

With the above described configuration, a capacitive pressure sensor is established, where the diaphragm 20 and portion 46 of electrode 42 effectively establish a "parallel" plate capacitor having a characteristic capacitance which varies inversely with d (which value is related to the pressure differential across the diaphragm 20).

In addition to the low piece count and simple structure of the above described embodiment of the invention, a further advantage is the ease and low cost techniques that may be used to assemble the sensor 10. More particularly, after separately forming elements 12 and 42. The electrode 42 may be placed with surface 46a facing downward on shims of thickness $d_o$ supported on a planar worksurface (where $d_o$ corresponds to the desired zero deflection separation of diaphragm 20 from surface 46a). Then, base member 12 may be inverted and placed over electrode 42 with the legs 48 extending through holes 19. The bonding material is then applied and cured to establish fixture elements 44. Finally, the combined electrode and base member configuration may be inverted and the diaphragm 20 may be fixed in place together with housing member 24 to complete the assembly, without need for special milling or finish.

In addition to the structure of the sensor 10 described above, an electronic circuit 60 may be integrally included within the region 30 of sensor 10. As shown in FIG. 2, the circuit 60 may be positioned on a printed circuit board 62 which is supported (at shoulder regions 48a) by legs 48. The circuit 60 is connected to electrode 42 and diaphragm 20 via leads 60a and 60b respectively, and includes an output lead 64 which passes via a feed-through function 66 to regions external to sensor 10.

Figure 4:
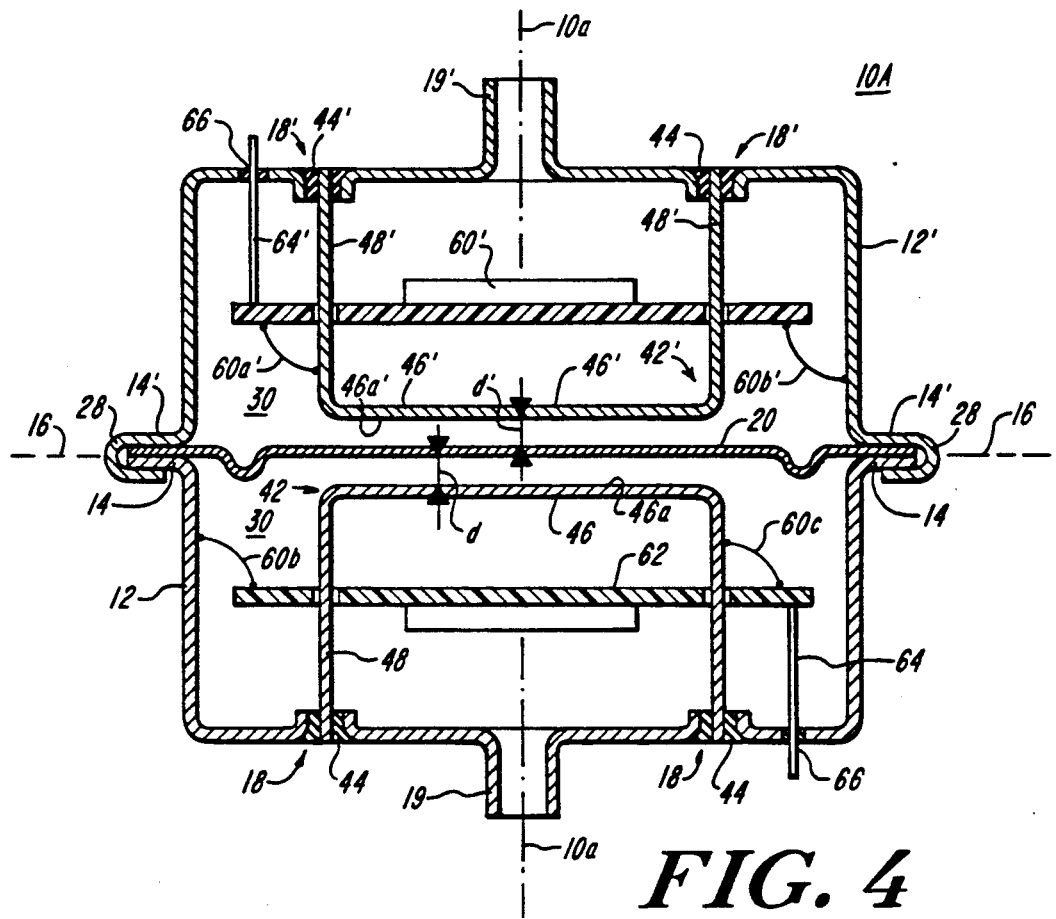
FIGS. 4., 5 and 6 show sectional views of alternative embodiments of the invention.

FIG. 4 shows a sensor 10A that is similar to sensor 10 of FIG. 2 but where the housing 24 has been replaced by an assembly similar to base member 12 and electrode 42. In FIG. 4, elements corresponding to elements in FIG. 2 are denoted by the same and primed (') reference designations. The sensor 10A of FIG. 4 operates in a similar manner to the system 10 but in a "push-pull" configuration; more particularly, the distance between the fixed planar electrode surfaces 46a and 46a' is fixed (D) so that $d+d'=D$. Such push-pull sensors are useful in known prior art circuit configurations, for example, as exemplified by those set forth in U.S. Pat. No(s). 4,386,312 and 4,054,833, assigned to the assignee of the present invention.

Figure 5:
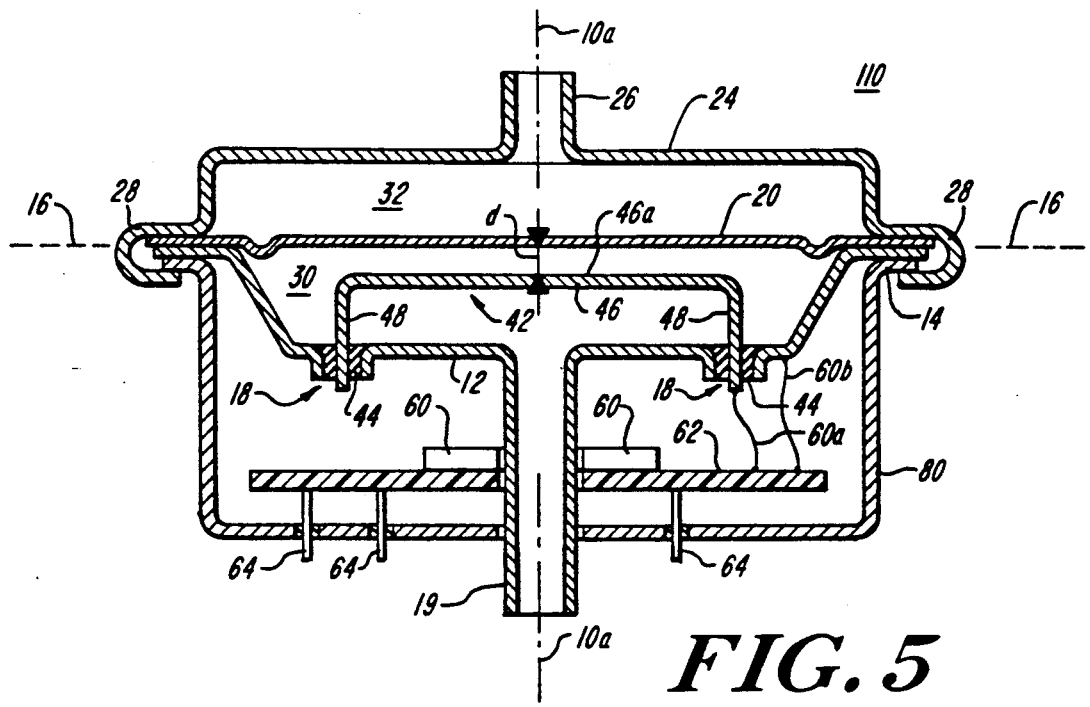
Figure 6:
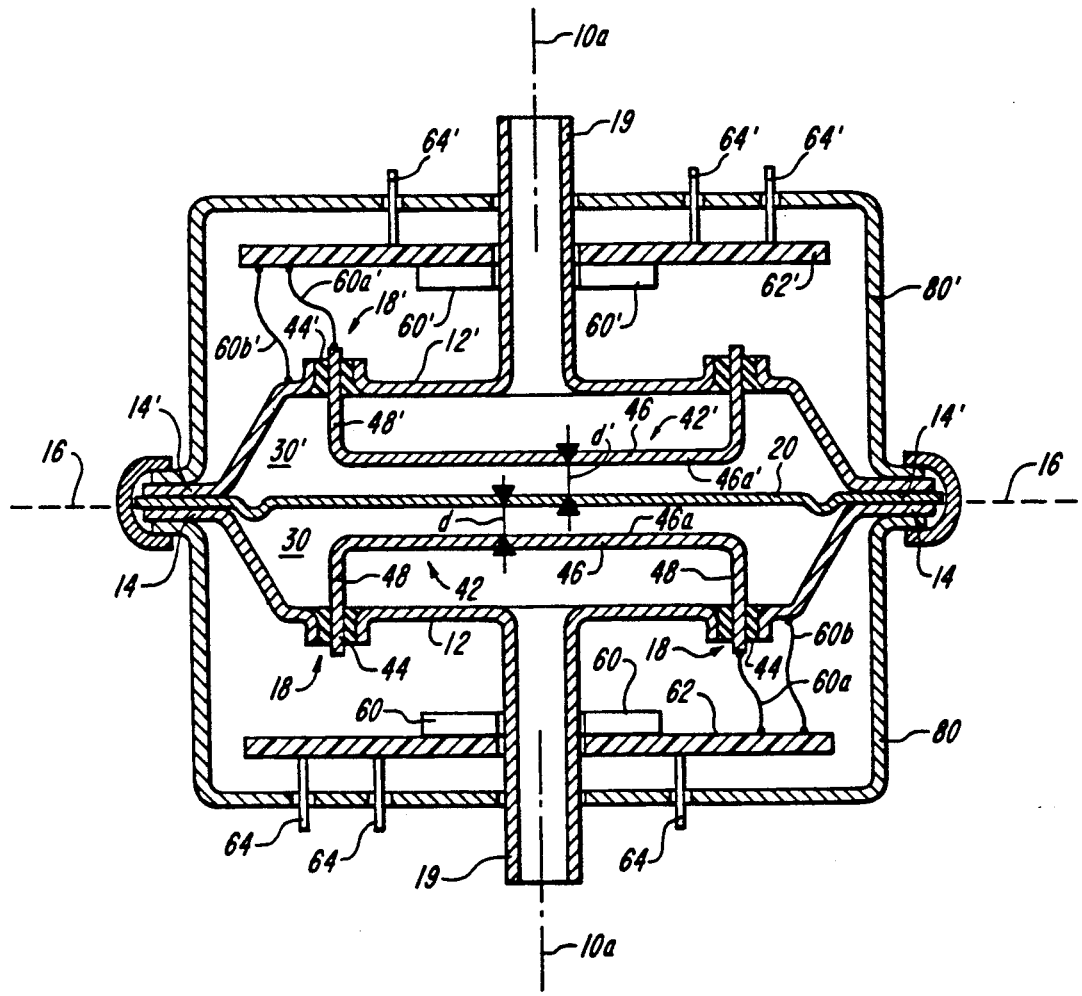

FIGS. 5 and 6 show embodiments 110 and 110' of the invention that are generally similar to the embodiments of FIGS. 2 and 4, respectively, with corresponding elements being identified with similar reference designations. In FIGS. (5 and 6) however, a housing member 80 (and 80') extends from rim 14 about the exterior of base member 12 (and 12'). port 19 (and 19') and leads 64 (and 64') extend through apertures in housing member 80 (and 80'). In these embodiments, base member 12 (and 12') and diaphragm 20 define the boundary of the region 30, while the housing member 80 (and 80') establish a protective outer housing. Also, in this configuration, the circuit 60 and board 62 are in the region within housing member 80 (and 80') but exterior to region 30.

The configurations of FIGS. 5 and 6 are less sensitive to thermal transients than those of FIGS. 2 and 4. For example, when the environmental change of temperature occurs very rapidly for the configurations of FIG. 2 and 4, there is a lag of temperature change between the legs of the electrode 42 (and 42') and the base member 12 (and 12'). This temperature differential can cause the capacitance to change momentarily. This type of transient thermal response is reduced greatly by the introduction of the housing member 80 (and 80') in the configurations of FIGS. 5 (and 6). In the latter configurations, not only are the legs of the electrode 42 much shorter compared to those in the configuration of FIGS. 2 and 4, but they are also protected by the housing member 80 (and 80') and will not respond rapidly when the temperature exterior to the sensor is changed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A capacitive pressure sensor comprising:
   A. a diaphragm having an electrically conductive central portion and having a first side and a second side,
   B. a first rigid concave base member extending about a central axis, and having peripheral rim lying in a first plane, said first plane being perpendicular to said central axis,
   C. means for securing the periphery of said diaphragm to said rim of said first base member whereby said diaphragm is nominally planar and said diaphragm periphery lies substantially in said plane, whereby said first base member and said diaphragm define a substantially closed first region housed in part by said first side of said diaphragm,
   D. first electrode assembly fixedly coupled to said first base member and including a substantially planar electrically conductive surface in said first region and substantially parallel to and separated by a gap, d, from said first side of said diaphragm, wherein said first electrode assembly includes:
      (i) a set of n apertures extending through said first base member, where n is an integer greater than or equal to 2,
      (ii) a first rigid, electrically conductive electrode including said substantially planar conductive surface and including n elongated leg portions extending away from said conductive surface and angularly offset therefrom, and extending through associated ones of said n apertures in said first base member,
      (iii) securing means for securing said leg portions in the respective ones of said associated apertures to the first base member whereby said first electrode is electrically insulated from said diaphragm, and said first region is pneumatically separate from a second region adjacent to the second side of said diaphragm.

2. A capacitive pressure sensor according to claim 1 wherein n=3 and said leg portions are equiangularly dispersed about said central axis.

3. A capacitive pressure sensor according to claim 1 wherein said substantially planar conductive surface of said electrode is planar.

4. A capacitive pressure sensor according to claim 1 wherein said substantially planar conductive surface of said electrode is slightly concave.

5. A capacitive pressure sensor according to claim 1 wherein each of said leg portions have a monotonically decreasing cross section in the direction away from said conductive surface.

6. A capacitive pressure sensor according to claim 5 wherein said securing means includes a dielectric bonding material disposed about said legs in said aperture, thereby establishing a shear joint.

7. A capacitive pressure sensor according to claim 1 further comprising a first concave housing member affixed at its periphery to said peripheral rim and wherein said first housing member and said diaphragm define said second region, said second region being substantially closed and bounded in part by said second side of said diaphragm.

8. A capacitive pressure sensor according to claim 1 further comprising a first concave outer housing member affixed at its periphery to said peripheral rim of said first base member, whereby first base member is enclosed by said first concave outer housing member.

9. A capacitive pressure sensor according to claim 1 further comprising:
   A. a second rigid concave base member extending about a central axis, and having peripheral rim lying in a first plane, said first plane being perpendicular to said central axis,
   B. means for securing said peripheral rim of said second base member to said rim of said first base member, whereby said second base member and said diaphragm define said second region, said second region being substantially closed and bounded in part by said second side of said diaphragm,
   C. second electrode assembly fixedly coupled to said second base member and including a substantially planar electrically conductive surface said second region and substantially parallel to and separated by a gap, d', from said second side of said diaphragm, wherein said second electrode assembly includes:
      (i) a set of m apertures extending through said second base member, where m is an integer greater than or equal to 2,
      (ii) a second rigid, electrically conductive electrode including said substantially planar conductive surface and including n elongated leg portions extending away from said conductive surface and angularly offset therefrom, and extending through associated ones of said m apertures in said second base member,
      (iii) securing means for securing said leg portions in the respective ones of said associated apertures to said second base member whereby said second electrode is electrically insulated from said diaphragm, and said second region is pneumatically separate from said second region.

10. A capacitive pressure sensor according to claim 9 wherein m=3 and said leg portions are equiangularly dispersed about said central axis.

11. A capacitive pressure sensor according to claim 9 wherein said substantially planar conductive surfaces of said electrodes are planar.

12. A capacitive pressure sensor according to claim 9 wherein said substantially planar conductive surfaces of said electrodes are slightly concave.

13. A capacitive pressure sensor according to claim 9 wherein each of said leg portions have a monotonically decreasing cross section in the direction away from said conductive surface.

14. A capacitive pressure sensor according to claim 13 wherein said securing means includes a dielectric bonding material disposed about said legs in said aperture, thereby establishing a shear joint.

15. A capacitive pressure sensor according to claim 9 further comprising a first concave outer housing member affixed at its periphery to said peripheral rim of said first base member, whereby first base member is enclosed by said first concave outer housing member and a second concave outer housing member affixed at its periphery to said peripheral rim of said second base member, whereby said second base member is enclosed by said second concave outer housing member.

* * * * *